(12) United States Patent
Choi

(10) Patent No.: US 7,313,408 B2
(45) Date of Patent: Dec. 25, 2007

(54) METHOD AND APPARATUS FOR ENHANCING PACKET SERVICE PERFORMANCE OF A MOBILE COMMUNICATION TERMINAL

(75) Inventor: Hyun-Kyung Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 658 days.

(21) Appl. No.: 10/923,141

(22) Filed: Aug. 19, 2004

(65) Prior Publication Data
US 2005/0043032 A1    Feb. 24, 2005

(30) Foreign Application Priority Data
Aug. 20, 2003  (KR) ............... 10-2003-0057611

(51) Int. Cl.
*H04B 7/00* (2006.01)
*H04Q 7/20* (2006.01)

(52) U.S. Cl. ............... 455/512; 455/509; 455/450; 455/452.2; 370/468; 370/395.42; 370/395.43; 370/444; 370/455

(58) Field of Classification Search ........... 455/450, 455/451, 452.1, 452.2, 509–513, 442, 426.1; 370/468, 349, 431, 444, 395.21, 395.42, 370/395.43, 455; 707/239, 240
See application file for complete search history.

(56) References Cited

U.S. PATENT DOCUMENTS 6,374,112 B1 * 4/2002 Widegren et al. ........ 455/452.2
6,400,731 B1 * 6/2002 Nitta ..................... 370/468
6,609,316 B2 * 8/2003 Ohba et al. ............ 370/395.42
2004/0196802 A1 * 10/2004 Bae et al. .............. 370/328
2007/0002742 A1 * 1/2007 Krishnaswamy et al. ... 370/235

FOREIGN PATENT DOCUMENTS

JP    06-062043    3/1994
JP    2001-136573  5/2001

* cited by examiner

*Primary Examiner*—Matthew Anderson
*Assistant Examiner*—Sujatha Sharma
(74) *Attorney, Agent, or Firm*—Lee, Hong, Degerman, Kang & Schmadeka

(57) ABSTRACT

A method and apparatus for enhancing performance of a packet service of a mobile communication terminal is disclosed. When the mobile communication terminal uses a packet service, an RAB set between the mobile communication terminal and a base station is compared to a reference value and the priority level of a packet service task processed in the mobile communication terminal is raised only when the mobile communication terminal is connected to the base station at or above the reference value. When the packet service is terminated, the priority level of the packet service task is returned to an original low priority level. The mobile communication terminal uses a maximum transmission speed for the packet service and when the mobile communication terminal uses a concurrent service requiring both real time service and packet service, packet service performance may be improved without affecting the real time service.

22 Claims, 3 Drawing Sheets

METHOD AND APPARATUS FOR ENHANCING PACKET SERVICE PERFORMANCE OF A MOBILE COMMUNICATION TERMINAL

CROSS-REFERENCE TO RELATED APPLICATIONS

Pursuant to 35 U.S.C. § 119(a), this application claims the benefit of earlier filing date and right of priority to Korean Application No. 57611/2003, filed on Aug. 20, 2003, the contents of which is hereby incorporated by reference herein in their entirety:

BACKGROUND OF THE INVENTION

1. Field of the Invention

The present invention relates to a method and apparatus for enhancing packet service performance of a mobile communication terminal and, more particularly, to a method and apparatus for enhancing packet service performance of a mobile communication terminal by varying a priority level of a packet service task according to a reference value such that a service required for real time processing in a communication network using the mobile communication terminal is not affected.

2. Description of the Related Art

Presently, mobile communication terminals supporting a third-generation communication network may provide a multimedia stream, such as a VOD (Video On Demand), or a multimedia message service using a packet service. A picture call communication service has been generalized and is currently used. In addition, a concurrent service capable of transmitting information data while performing a voice communication may also be available.

FIG. 1 illustrates a conceptual view of a hierarchical structure for processing a packet service in a mobile communication terminal supporting the general third-generation communication network. The third-generation mobile communication terminal 1 for providing a packet service including a multimedia stream includes an embedded application 10 called a TE (Terminal Equipment) and a communication protocol unit 20.

The application 10 is a function for processing a TCP (Transmission Control Protocol)/IP (Internet Protocol)/PPP (Point-to-Point Protocol) stack, and may include a user interface. The application 10 is an upper application adopted for the mobile communication terminal 1, which supports a packet service and an Internet communication protocol to transmit and receive various packet data to and from a user and provide a user interface. The communication protocol unit 20 includes a protocol part (TCP/UDP, IP, PPP) 22 for processing an actual packet service and a socket API (Application Program Interface) 21 for enabling the protocol part 22 to interface with the application 10.

The mobile communication terminal 1 has an operating system for processing tasks internally in order to support various services. In the operating system, priority levels are assigned to various tasks with the various tasks processed according to their priority level in order to implement multitasking within an overall system.

Generally, a priority level assigned to a task for processing a packet service in the mobile communication terminal 1 is relatively low, but higher than a task for processing a sleep mode or for processing a menu, which have the lowest priority levels. In other words, when the mobile communication terminal 1 does not perform any operation or processing, it can process a packet service.

Since a task for processing a packet service cannot be processed until other tasks with higher levels are processed, the processing of a packet service is frequently delayed and the packet service processing speed of the mobile communication terminal is slower than the data transmission speed provided by a communication network. Therefore, performance of the packet service is degraded.

For example, the packet service supported in a present third-generation communication network is a maximum 64 kbps uplink data rate and a 384 kbps downlink data rate. However, even if a radio access bearer (RAB) between a mobile communication terminal and a base station is set at 384 kbps, performance of the packet service cannot be implemented at the maximum speed if the priority level of the packet service task is too low.

One related art method of solving this problem is to set the priority level of a packet service task higher than that of other tasks affecting the performance of the packet service. However, other services may be affected, such as a voice service and a picture phone service implemented on a real time basis. Therefore, the performance of the packet service is enhanced such that the priority level of the packet service task is set higher only when the mobile communication terminal performs the packet service. When the packet service is terminated, the priority of the packet service task returns to its original priority level.

In the related art packet service method, when the mobile communication terminal processes the packet service, the performance can be enhanced without affecting other services. However, when at least one other service, such as voice service, and the packet service are simultaneously implemented such that two or more services are concurrently executed, raising the priority level of the packet service task inevitably affects the other services processed on a real time basis.

In one related art packet service method, since the packet service task, which does not need to be performed on a real time basis, has a very low priority level, performance of the packet service is degraded. In another related art packet service method, the priority level of the packet service task is raised, thereby affecting other services that are simultaneously processed on a real time basis.

Therefore, a method and apparatus is needed that enhances the performance of a packet service of a mobile communication terminal without affecting other services that are performed on a real time basis. The present invention meets these and other needs.

SUMMARY OF THE INVENTION

The present invention is directed to a to a method and apparatus for enhancing the performance of a packet service of a mobile communication terminal without affecting other services that are performed on a real time basis.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a mobile communication terminal that is capable of implementing a packet service at a maximum transmission speed. Specifically, the performance of a packet service is enhanced by setting a higher priority for a packet service task if the radio access bearer (RAB) set between the mobile communication terminal and a base station is greater than or equal to a reference value and resetting the priority of the packet service task to a lower original value upon termination of the packet service. Although the invention is described herein with regard to a mobile telephone, it is contemplated that the invention may be utilized anytime it is desired to enhance the performance of a packet service of a mobile communication device without affecting other services that are performed on a real time basis.

In one aspect of the invention, a method is provided for enhancing performance of a packet service of a mobile communication terminal. The method includes comparing a radio access bearer (RAB) set between a mobile communication terminal and a base station to a reference value, raising a priority level of a packet service task if the RAB is greater than or equal to the reference value, performing the packet service at the appropriate priority level and returning the priority level of the packet service task to an original priority level upon termination of the packet service.

It is contemplated that the reference level to which the RAB is compared may be a limit speed for performing the packet service task with a preset priority level. It is further contemplated that the reference level may be one of several limit speeds corresponding to one of various packet service tasks each having a different priority level. In a preferred embodiment, the reference value is 128 kbps.

The method also may include receiving a packet data protocol (PDP) modify request message from a base station, determining if the requested modification is possible and transmitting a PDP modify accept message to the base station if the requested modification is possible. If the requested modification is not possible, a PDP modify reject message may be transmitted to the base station.

If the requested modification is made, the priority level of the packet service may be re-adjusted based on a modified PDP by comparing an RAB according to the modified PDP with the reference value and either raising the priority level or maintaining the priority level. The priority level of the packet service task is raised if the RAB according to the modified PDP is greater than or equal to the reference value. The priority level of the packet service task is maintained if the RAB according to the modified PDP is less than the reference value.

In another aspect of the invention, a method is provided for enhancing performance of a packet service of a mobile communication terminal. The method includes transmitting a call for a packet service between a mobile communication terminal and a base station, comparing a radio access bearer (RAB) set between the mobile communication terminal and the base station to a reference value, raising a priority level of a packet service task if the RAB is greater than or equal to the reference value, performing the packet service at the appropriate priority level, modifying a PDP according to a request from the base station and releasing the packet call and returning the priority level of the packet service task to an original priority level upon receiving a packet service termination message.

It is contemplated that the reference level to which the RAB is compared may be a limit speed for performing the packet service task with a preset priority level. It is further contemplated that the reference level may be one of several limit speeds corresponding to one of various packet service tasks each having a different priority level. In a preferred embodiment, the reference value is 128 kbps.

Modifying the PDP may include receiving a PDP modify request message from the base station, transmitting a PDP modify accept message to the base station if the PDP modification is accepted, comparing an RAB according to the modified PDP to the reference value and re-adjusting the priority level of the packet service task based on the comparison result. If the requested modification is not accepted, a PDP modify reject message may be transmitted to the base station and the packet service performed while maintaining the priority level of the packet service task.

Re-adjusting the priority level of the packet service task based on the comparison result may include either raising the priority level or maintaining the priority level. The priority level of the packet service task is raised if the RAB according to the modified PDP is greater than or equal to the reference value. The priority level of the packet service task is maintained if the RAB according to the modified PDP is less than the reference value.

In yet another aspect of the invention, a mobile communication terminal is provided. The mobile communication terminal is adapted to perform the methods of the present invention to enhance performance of a packet service by comparing an RAB set between the mobile communication terminal and a base station to a reference value, raising or maintaining the priority level of a packet service task based on the comparison result and returning the priority level of the packet service task to an original low priority level upon termination of the packet service.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a method and apparatus for enhancing the performance of a packet service of a mobile communication terminal without affecting other services that are performed on a real time basis. Although the invention is described herein with regard to a mobile telephone, it is contemplated that the invention may be utilized anytime it is desired to enhance the performance of a packet service of a mobile communication terminal. In describing the present invention, if a detailed explanation for a related known function or construction is considered unnecessary, such explanation has been omitted but would be understood by those skilled in the art.

Figure 1:
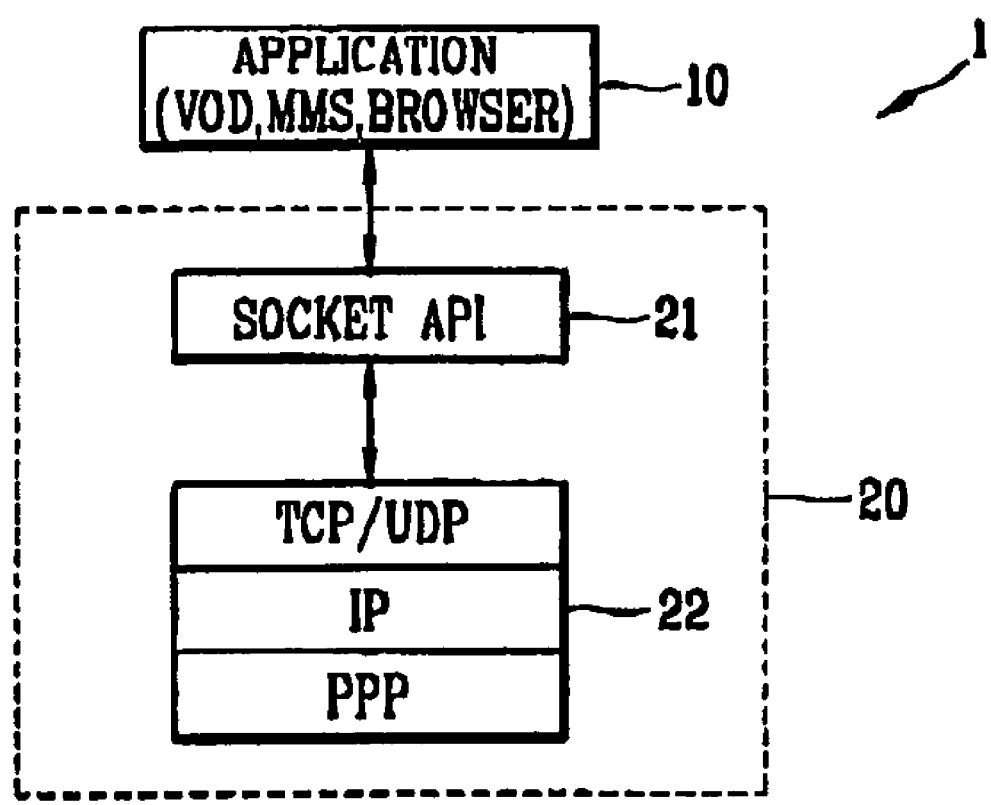
FIG. 1 is a conceptual view illustrating a hierarchical structure for processing a packet service in a mobile communication terminal.
Figure 2:
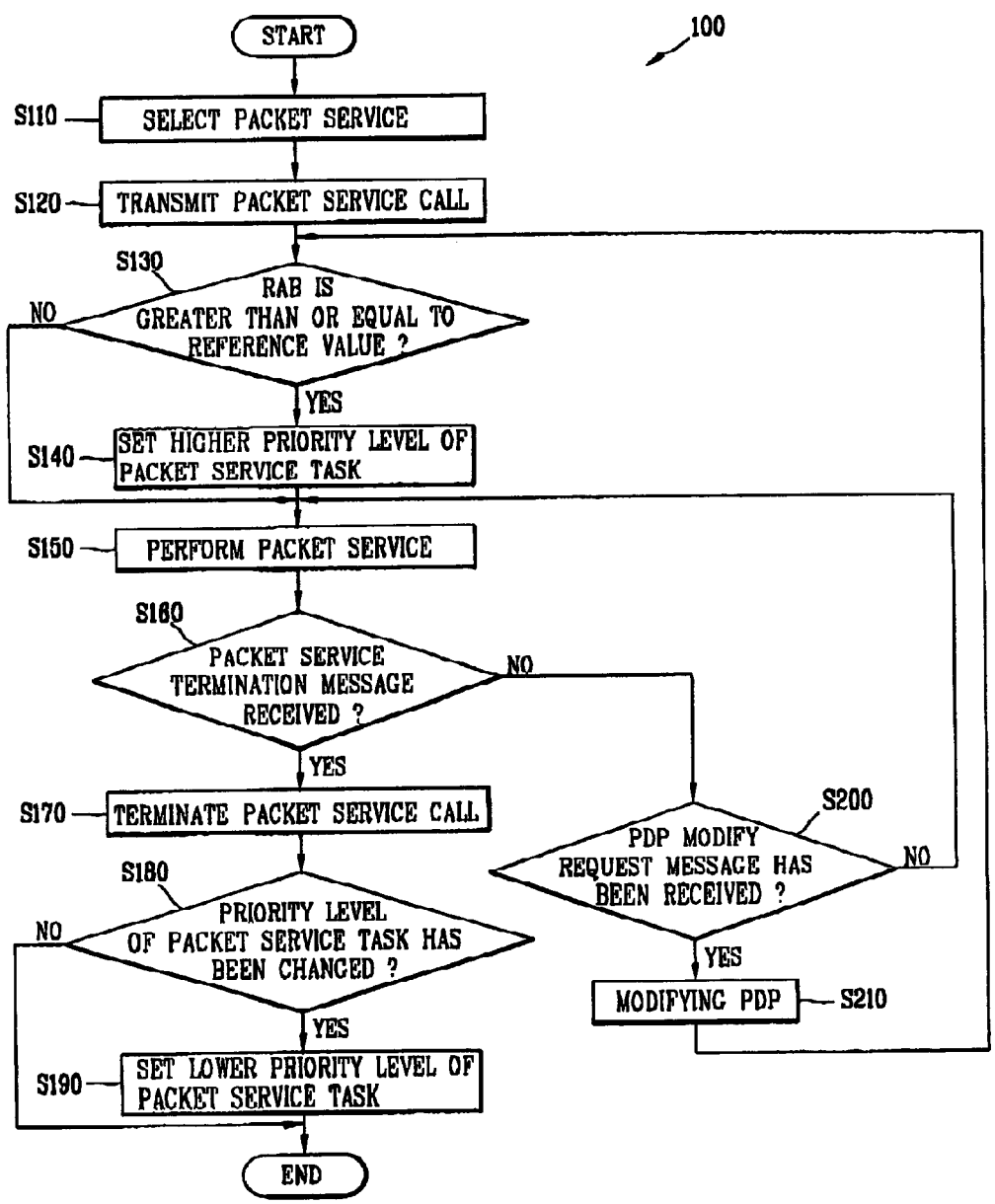
FIG. 2 illustrates a flow chart of a method for enhancing performance of a packet service of a mobile communication terminal in accordance with one embodiment of the present invention.

FIG. 2 illustrates a flow chart of a method for enhancing performance of a packet service of a mobile communication terminal in accordance with one embodiment of the present invention. The method 100 includes selecting a packet service (S100), transmitting a packet service call (S120), comparing a radio access bearer (RAB) set between the mobile communication terminal and a base station to a reference value (S130), raising the priority of the packet service task if the set RAB is greater than or equal to the reference value (S140), performing the packet service (S150), processing a message to terminate the packet service (S160), processing a message to modify the packet data protocol (PDP) (S200, S210) and lowering the priority level of the packet service task to an original low priority level upon termination of the packet service if the priority level was raised (S180, S190).

When a user selects one of various packet service applications available in a mobile communication terminal in step S110, for example from a menu, a packet service call for the corresponding packet service is transmitted to a base station in step S120, for example upon pressing a 'send' key. If a packet call is set normally between the mobile terminal and the base station, a packet data protocol activate accept message is generated and a packet service is connected. If, however, the packet call is not set normally, a PDP (Packet Data Protocol) activate reject message is generated and a packet service is not connected.

If the packet call is set, the mobile communication terminal compares a radio access bearer (RAB) set between the mobile communication terminal and the base station to a reference value in step S130. If the RAB is greater than or equal to the reference value, the priority level of the packet service task is set higher in step S140 and the packet service of the selected application is performed at the appropriate higher priority level in step S150. If the RAB is smaller than the reference value, a packet service of the selected application is performed while maintaining a currently set priority level of the packet service task in step S150.

It is contemplated that any limit speed for processing a packet service task with a preset priority level may be used as the reference value. It is further contemplated that several limit speeds may be determined for a plurality of packet service tasks corresponding to various reference values and related priority levels to be set.

In a preferred embodiment of the present invention, the reference value is 128 kbps. The reason 128 kbps is used as the reference value in the preferred embodiment of the present invention is that in one base station of a current mobile communication network, a maximum of four mobile communication terminals with a maximum transmission speed of 384 kbps may be connected, so the RAB should be limited to 128 kbps in order to use a concurrent service implementing both voice service and packet service.

In the preferred embodiment, the priority level of the packet service task is maintained low so as not to affect a real time processing service such as a voice service if a RAB set between the mobile communication terminal and the base station is smaller than 128 kbps. If the set RAB is between 128 kbps and 384 kbps, the priority level of the packet service task is set higher in order to enhance performance of the packet service.

If a packet service termination message is received, it is processed in step S160. The service termination message is a packet data protocol (PDP) deactivate request message inputted by the user by pressing an 'END' key or received from a base station due to an error in a communication network.

When the termination message is received, the packet call set between the base station and the mobile communication terminal is terminated in step S170 and it is determined in step S180 whether the priority level of the packet service task was changed. If the priority level of the packet service task was changed, the priority level is set to a lower original priority level in step S190. If there is no change in the priority level, the current state is maintained.

If the mobile communication terminal receives a PDP modify request message requesting modification of a QoS (Quality of Service) from the base station while the packet service is being provided, the request message is processed in step S200. If the PDP modify request message is properly received, a PDP modify accept message is transmitted to the base station, the PDP is modified per the requested QoS in step S210 and the process of comparing the RAB of the modified PDP to a reference value in order to set the appropriate priority level in steps S130 and S140 is repeated. If, however, the mobile communication terminal fails to properly receive the PDP modify request message or cannot perform the PDP modification, a PDP modify reject message is transmitted to the base station and the currently set packet service is performed in step S150.

In the method 100 for enhancing performance of a packet service of a mobile communication terminal, when the mobile communication terminal uses a packet service, a set RAB speed is compared with a reference communication speed. The priority level of the packet service task processed in the mobile communication terminal is set higher only when the mobile communication terminal is connected to the base station at or above the reference communication speed. When the packet service is terminated, the priority level of the modified packet service task is returned to a lower original priority level.

Figure 3:
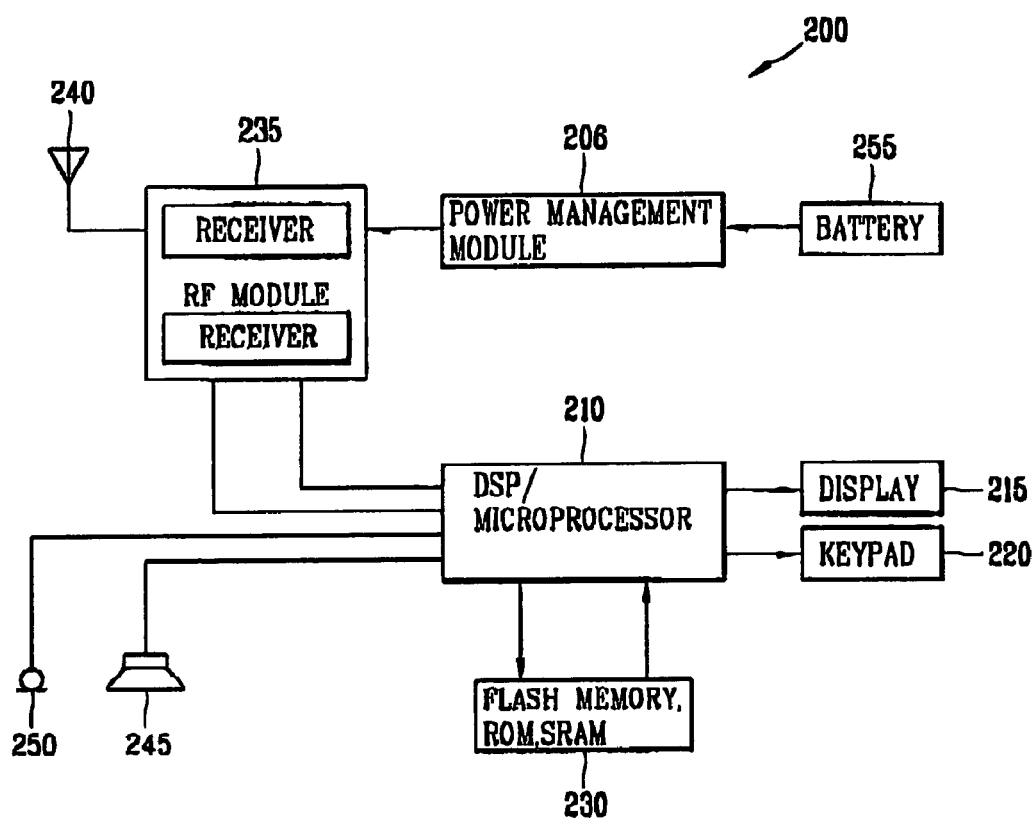
FIG. 3 is a block diagram illustrating a mobile communication terminal of the present invention for performing the method illustrated in FIG. 2.

Referring to FIG. 3, a block diagram of a mobile communication terminal 200 of the present invention is illustrated, for example a mobile phone for performing the methods of the present invention. The mobile communication device 200 includes a processing unit 210 such as a microprocessor or digital signal processor, an RF module 235, a power management module 205, an antenna 240, a battery 255, a display 215, a keypad 220, a memory unit 230 such as flash memory, ROM or SRAM, a speaker 245 and a microphone 250.

The processing unit 110 is adapted receive a user selection of a packet service application, transmit a packet call to a base station, receive a radio access bearer (RAB) set between the base station and mobile communication terminal, compare the set RAB to a reference value and perform the selected packet service at a higher priority level or at a lower original priority level depending on the comparison result as well as to receive and process a packet service termination message in order to terminate the packet service by setting the lower original priority level and receive a packet data protocol (PDP) modification message in order to modify the performed packet data service and set the appropriate priority level corresponding to the modified PDP. The memory unit 130 is adapted to store one or more reference values and corresponding priority levels for comparison to the set RAB.

As so far described, the method and apparatus for enhancing performance of a packet service of a mobile communication terminal has the several advantages. First, when the mobile communication terminal uses a packet service, a maximum transmission speed is implemented and when the mobile communication terminal uses a concurrent service requiring both real time service and packet service, the packet service performance may be improved without affecting the real time service. Additionally, reliability may be improved by enhancing performance of the packet service by simply modifying an internal program.

It will be apparent to one skilled in the art that the preferred embodiments of the present invention can be readily implemented using, for example, the processor 210 or other data or digital processing device, either alone or in combination with external support logic.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for enhancing performance of a packet service of a mobile communication terminal, comprising:
    comparing a radio access bearer (RAB) set between a mobile communication terminal and a base station to a reference value;
    raising a priority level of a packet service task if the RAB is one of greater than and equal to the reference value;
    performing a packet service; and
    returning the priority level of the packet service task to an original priority level upon termination of the packet service.

2. The method of claim 1, wherein the reference value comprises a limit speed for performing the packet service task with a preset priority level.

3. The method of claim 1, wherein the reference value comprises one of a plurality of limit speeds, each limit speed corresponding to one of a plurality of packet service tasks and wherein each packet service task has a different priority level.

4. The method of claim 1, wherein the reference value is 128 kbps.

5. The method of claim 1, wherein performing the packet service comprises:
    receiving a packet data protocol (PDP) modify request message from a base station;
    determining if the requested modification is possible; and
    transmitting a PDP modify accept message to the base station if the requested modification is possible.

6. The method of claim 5, wherein a PDP modify reject message is transmitted to the base station if the requested modification is not possible.

7. The method of claim 5, further comprising re-adjusting the priority level of the packet service task based on a modified PDP if the PDP is modified.

8. The method of claim 7, wherein re-adjusting the priority level of the packet service task comprises:
    comparing an RAB according to the modified PDP with the reference value; and
    one of raising the priority level of the packet service task and maintaining the priority level of the packet service task, wherein the priority level is raised if the RAB according to the modified PDP is one of greater than and equal to the reference value and the priority level is maintained if the RAB according to the modified PDP is less than the reference value.

9. A method for enhancing performance of a packet service of a mobile communication terminal, comprising:
    transmitting a call for a packet service between a mobile communication terminal and a base station;
    comparing an RAB set between the mobile communication terminal and the base station to a reference value;

raising a priority level of a packet service task if the RAB is one of greater than and equal to the reference value;

performing the packet service;

modifying a packet data protocol according to a request from the base station; and releasing the packet call and adjusting the priority level of the packet service task to an original low priority level when a packet service termination message is received.

10. The method of claim 9, wherein modifying the packet data protocol comprises:

receiving a PDP modify request message from the base station;

transmitting a PDP modify accept message to the base station if the PDP modification is accepted;

comparing an RAB according to the modified PDP to the reference value; and re-adjusting the priority level of the packet service task based on the comparison of the RAB according to the modified PDP to the reference value.

11. The method of claim 10, further comprising:

transmitting a PDP modify reject message to the base station if the PDP modification is not accepted; and performing the packet service while maintaining the priority level of the packet service task.

12. The method of claim 10, wherein re-adjusting the priority level of the packet service task comprises one of raising the priority level of the packet service task and maintaining the priority level of the packet service task, wherein the priority level is raised if the RAB according to the modified PDP is one of greater than and equal to the reference value and the priority level is maintained if the RAB according to the modified PDP is less than the reference value.

13. The method of claim 9, wherein the reference value comprises a limit speed for processing the packet service task with a preset priority level.

14. The method of claim 9, wherein the reference value comprises one of a plurality of limit speeds, each limit speed corresponding to one of a plurality of packet service tasks and wherein each packet service task has a different priority level.

15. The method of claim 9, wherein the reference value is 128 kbps.

16. A mobile communication terminal for enhancing performance of a packet service, the mobile communication terminal comprising:

an RF module;

a storage unit; and a processing unit adapted to compare a radio access bearer (RAB) set between the mobile communication terminal and a base station to a reference value, raise a priority level of a packet service task if the RAB is one of greater than and equal to the reference value, perform a packet service and return the priority level of the packet service task to an original priority level upon termination of the packet service.

17. The mobile communication terminal of claim 16, wherein the storage unit is adapted to store at least one reference value.

18. The mobile communication terminal of claim 16, the processing unit further adapted to compare the RAB to one of a plurality of limit speeds, each limit speed corresponding to one of a plurality of packet service tasks and wherein each packet service task has a different priority level.

19. The mobile communication terminal of claim 16, wherein the processing unit is further adapted to:

receive a packet data protocol (PDP) modify request message from a base station;

determine if the requested modification is possible; and transmit a PDP modify accept message to the base station if the requested modification is possible.

20. The mobile communication terminal of claim 19, wherein the processing unit is further adapted to:

transmit a PDP modify reject message to the base station if the requested modification is not possible; and perform the packet service while maintaining the priority level of the packet service task.

21. The module communication terminal of claim 19, wherein the processing unit is further adapted to compare an RAB according to a modified PDP to the reference value; and re-adjust the priority level of the packet service task based on the comparison of the RAB according to the modified PDP to the reference value.

22. The mobile communication terminal of claim 16, wherein the processing unit is further adapted to:

transmit a call for a packet service between a mobile communication terminal and a base station;

modify a packet data protocol according to a request from the base station; and release the packet call and adjust the priority level of the packet service task to an original low priority level when a packet service termination message is received.

* * * * *